United States Patent [19]

Genjida et al.

[11] 4,233,170
[45] Nov. 11, 1980

[54] WATER-GLYCOL HYDRAULIC FLUID CONTAINING POLYOXYALKYLENE ETHERS

[75] Inventors: Fumihide Genjida; Toyoaki Nasuno; Hideo Kobayashi; Motohiko Ii, all of Kyoto, Japan

[73] Assignee: Sanyo Chemical Industries, Limited, Kyoto, Japan

[21] Appl. No.: 2,600

[22] Filed: Jan. 11, 1979

[30] Foreign Application Priority Data

Feb. 7, 1978 [JP] Japan .................................. 53-13325

[51] Int. Cl.$^3$ .............................................. C10M 3/22
[52] U.S. Cl. ...................................................... 252/73
[58] Field of Search .................. 252/73, 49.3; 568/601, 568/623, 624; 536/120

[56] References Cited

U.S. PATENT DOCUMENTS

| | | | |
|---|---|---|---|
| 2,462,694 | 2/1949 | Walker | 252/75 |
| 2,657,181 | 10/1953 | Van Horn et al. | 568/624 X |
| 2,902,478 | 9/1959 | Anderson | 536/120 |
| 3,329,614 | 7/1967 | Milnes et al. | 568/601 X |
| 3,341,456 | 9/1967 | Sawyer | 568/624 X |
| 3,346,501 | 10/1967 | Boehmer | 252/73 |
| 3,377,288 | 4/1968 | Sawyer | 252/73 X |
| 3,379,644 | 4/1968 | Katzenstein | 252/73 |
| 3,992,312 | 11/1976 | Genjida et al. | 252/77 |

FOREIGN PATENT DOCUMENTS

| | | |
|---|---|---|
| 618538 | 2/1949 | United Kingdom . |
| 673951 | 6/1952 | United Kingdom . |
| 686550 | 1/1953 | United Kingdom . |
| 1017951 | 1/1966 | United Kingdom . |

*Primary Examiner*—Harris A. Pitlick
*Attorney, Agent, or Firm*—Oblon, Fisher, Spivak, McClelland & Maier

[57] ABSTRACT

A non-flammable hydraulic fluid comprises a water soluble alkylene oxide adduct of a nitrogen-free polyhydric alcohol having at least five hydroxyl groups, water and a glycol.

20 Claims, No Drawings

WATER-GLYCOL HYDRAULIC FLUID CONTAINING POLYOXYALKYLENE ETHERS

BACKGROUND OF THE INVENTION

1. Field of the Invention

This invention relates to an improved non-flammable hydraulic fluid. It further relates to a hydraulic fluid of the type mentioned having improved shear stability and superior lubricating or wear preventing qualities.

2. Description of the Prior Art

In the prior art, numerous hydraulic fluids have been proposed. Some of these are of the mineral oil type which are advantageous in their good lubricating and anti-wear properties, but which are rather highly flammable and thereby unsuitable for certain uses. For example, in factories, such as iron works, in which machinery is often operated at high temperature, the hydraulic fluids used to control the machinery have frequently been a source of fire and danger. For this reason, there is a growing demand for non-flammable hydraulic fluids, and mineral oil type fluids are gradually being converted to non-flammable types.

Conventional non-flammable hydraulic fluids are mainly classified into three groups—phosphate esters; w/o (water in oil) emulsions; and water-glycol based fluids. The phosphate esters have good anti-wear qualities, but have a high cost and have the further disadvantage in that it is difficult to treat waste fluids derived from their use. While the w/o emulsions are relatively inexpensive, they tend to separate into their constituent components during use, and they also tend to suffer deterioration of some of their properties due to the propagation of bacteria. Moreover, they have poor wear reducing properties.

Water-glycol fluids commonly have high non-flammability, good stability and a relatively low cost. The water-glycol fluids, however, have poor anti-wear characteristics. Moreover, the fluids are deteriorated by metal dust resulting from metal wear thereby causing serious difficulties. For example, when conventional water glycol hydraulic fluids are used in hydraulic devices, e.g. vane pumps, designed and manufactured for use with mineral oil hydraulic fluids, the result is significant wear of the cam ring [which is made of ball-bearing steel (relatively soft steel)] even under mild conditions (i.e., a fluid temperature of 50° C. and 70 Kg/cm$^2$ or less of pressure). In extreme cases, the ring is worn in an amount in excess of 1,000 mg. While wearing of the vanes [which are made of high speed steel (harder than ball-bearing steel)] is relatively minor, the fluids tend to form deposits at the head of the vanes. Furthermore, metal dust or sludge resulting from wear tend to deposit on the filter, thereby decreasing its capacity. Some metal will also disperse into the fluids themselves making them turbid. Such metal dust or sludge catalyzes the oxidation of the fluids whereby the resultant oxidized fluid is characterized by poorer wear-preventing qualities.

In the past, there have been various attempts to improve the poor lubricating properties or poor wear-prevention properties of these fluids. For example, one method modifies the polyalkylene polyol which is often added to conventional water-glycol fluids. Another technique incorporates into these fluids such conventional additives as oil improvers, E.P. agents, rust inhibitors and sequestering agents. However, none of these methods have been effective for their intended purposes. As a result, a need continues to exist for water-glycol fluids which have good lubricating properties.

There has been proposed a water-glycol based hydraulic fluid comprising a water soluble alkylene oxide adduct of a polyamide. This fluid has improved lubricating properties, but it has poor shear stability.

SUMMARY OF THE INVENTION

Accordingly, one object of this invention is to provide non-flammable hydraulic fluids having a water-glycol base which have improved overall properties.

Another object of this invention is to provide non-flammable hydraulic fluids having a water-glycol base which have improved shear stability.

Yet another object of this invention is to provide non-flammable hydraulic fluids of a water-glycol base having superior lubricating properties.

Briefly, these and other objects of this invention as hereinafter will become more readily apparent by the ensuing discussion have been attained broadly by providing an improved non-flammable hydraulic fluid which comprises 5–30% of a water soluble polymer comprising a polyoxyakylene ether of a polyhydric alcohol having at least five hydroxyl groups and having no nitrogen atom, 30–60% of water and 15–60% of a glycol.

DESCRIPTION OF THE PREFERRED EMBODIMENTS

In this invention, the water soluble polymer comprises a polyoxyalkylene ether of a nitrogen-free polyhydric alcohol having at least five hydroxyl groups.

The nitrogen-free polyhydric alcohols constituting the polyoxyalkylene ethers used in this invention include polyhydric alcohols having the general formula:

wherein n is an interger of at least 5 and R is a polyvalent (at least 5 valent) hydrocarbon radical which may contain one or more etherally combined oxygen atoms.

Illustrative examples of the nitrogen-free polyhydric alcohols are saccharides, derivatives of saccharides, poly-alkane polyols, and mixtures thereof.

Suitable saccharides include monosaccharides and polysaccharides. Suitable monosaccharides include, for example, aldohexoses (such as glucose, mannose, galactose, allose, altrose, talose, gulose and idose); and ketohexoses (such as fructose, sorbose, psicose and tagatose). Polysaccharides include oligosaccharides, for example, disaccharides (such as trehalose, sucrose, cellobiose and lactose), trisaccharides (such as raffinose, gentianose, hexatriose and mannitriose) and tetrasaccharides (such as stachyose); and other polysaccharides (such as starch and cellulose); and hydrolyzates of polysaccharides.

Suitable saccharide derivatives include sugaralcohols and glycosides. Suitable sugaralcohols include pentitols (such as adonite, arabitol and xylitol) and hexitols (such as sorbitol, mannitol, iditol, talitol, dulcitol and allit). Suitable glycosides include glucosides of polyols, for example, glycols (such as ethylene glycol and propylene glycol), and alkanepolyols such as triols (such as glycerin, 1,1,1-trimethylol propane and 1,2,6-hexanetriol) and tetraols (such as pentaerythritol).

The term "poly-alkanepolyol" means a polycondensation product of alkanepolyols (such as glycerin and pentaerythritol). The degree of the polycondensation is usually 2 to 10 or more. Illustrative examples of polyalkanepolyols are polyglycerins having a polycondensation degree of 3 to 10, dipentaerythritol and tripentaerythritol.

There may be used mixtures of two or more nitrogen-free polyhydric alcohols having average functionality of at least 5, including mixtures of the above mentioned polyhydric alcohols, as well as mixtures of the polyhydric alcohol having more than 5 hydroxyl groups with polyhydric alcohol having less than 5 [for example, tetraols (such as pentaerythritol and methyl glucoside), triols (such as glycerin, trimethylol propane, hexanetriol) and glycols (such as ethylene glycol, propylene glycol and butylene glycol)].

The nitrogen-free polyhydric alcohols (or mixtures thereof) have at least 5, preferably 6 to 8 hydroxyl groups (or average functionality of at least 5 preferably 6 to 8).

Polyoxyalkylene derivatives of polyhydric alcohols having lower functionality than 5 result in poor anti-wear qualities.

Among these nitrogen-free polyhydric alcohols, the preferred are saccharides and derivatives of saccharides in view of anti-wear qualities and ease of production operations. Oligosaccharides (especially saccharose) and sugaralcohols (especially sorbitol) are most preferred.

The polyoxyalkylene ether used in this invention has oxyalkylene groups comprising both oxyethylene groups and other oxyalkylene groups. The other oxyalkylene groups include oxypropylene(1,2-), oxybutylenes (1,2-; 2,3-; 1,3- or 1,4-), oxytetramethylene and oxystyrene groups. The other preferred oxyalkylene group is an oxypropylene group. The ratio of the amount of the oxyethylene groups (A) to that of the other oxyalkylene groups (B) is not critical. It is preferably 50(A):50(B)–90:10 by weight, and more preferably 60:40–85:15 by weight, depending upon the water solubility and properties of the liquid state involved. The oxyethylene groups and the other oxyalkylene groups are present in random form.

Introduction of these groups is generally made by adding alkylene oxides to the nitrogen-free polyhydric alcohols as in conventional methods. Thus, the polyoxyalkylene ether may be produced by adding alkylene oxides to the polyhydric alcohols in this invention in the presence of an alkaline catalyst (such as NaOH or KOH), and an amine catalyst (such as NH$_4$OH and dimethylamine) or an acidic catalyst (such as boron trifluoride ethyl etherate) at 50°–150° C. under a gauge pressure of 0–10 Kg/cm$^2$. It may also be prepared by adding glycerin and the previously produced polyoxyalkylene ether to the polyhydric alcohol of this invention in the presence of water.

The resultant polymer may contain free active hydrogen atoms which remain unreacted with the alkylene oxides.

The molecular weight of the polyoxyalkylene ether is generally 5,000–200,000, preferably 10,000–150,000. If the value exceeds 200,000, the polymer will be solid and the solubility in water will decrease. Moreover, the production of the polymer will be difficult. On the other hand, a molecular weight of less than 5,000 is unsatisfactory from the view point of the resultant viscosity. In this invention, the molecular weight is determined by the hydroxyl value of the polymer.

The fluid of this invention contains, as a thickener component, at least one water soluble polymer comprising the above mentioned polyoxyalkylene ether. The polyoxyalkylene ether may be used in combination with one or more other water soluble polymers. Examples of other water soluble polymers are polyoxyalkylene derivatives of polyols having less than 5 hydroxyl groups such as glycerin, trimethylol propane and pentaerythritol, and polyoxyalkylene derivatives of nitrogen-containing compounds having active hydrogen atoms such as alkanol amines, polyamines and polyamides.

When the water soluble polymer contains the polyoxyalkylene ether in this invention and the conventional polymer, the amounts of the polyoxyalkylene ether are preferably 50% by weight or more, based on the total amounts of the water soluble polymers.

The above-mentioned water soluble polymer is used as one of the components of a water-glycol based hydraulic fluid. The resultant hydraulic fluids of this invention comprise (1) water, (2) the above water soluble polymer (thickener) and (3) a glycol (viscosity modifier). The weight ratio of the three components should be as follows:

| | | | |
|---|---|---|---|
| (1) | water | 30–60%, | preferably 35–50%; |
| (2) | the polymer(s) | 5–30% | (preferably 10–20%; and |
| | (i) the polyoxyalkylene ether | | |
| | (ii) the other polymer | 5–30% | (preferably 10–20%), and |
| | | 0–25% | (preferably 0–15%); and |
| (3) | glycol | 15–60% | (preferably 30–50%) |

The hydraulic fluids of this invention may also contain other components as in conventional fluids. Suitable formulations of the fluid of this invention with such additives are as follows:

| | | | |
|---|---|---|---|
| (1) | Water | 35–50 | |
| (2) | Water soluble polymer(s) | 12–20 | |
| | (i) The polyoxyalkylene ether | 12–17 | |
| | (ii) The other polymer | 0–8, | Preferably 0–5 |
| (3) | Viscosity modifier (or pour point depressant) | 25–50 | |
| (4) | Oiliness improver | 0–15, | Preferably 1–10 |
| (5) | Rust inhibitor | 0–7, | Preferably 0.1–5 |
| (6) | pH conditioner | 0–2 | |
| (7) | Foam inhibitor | 0–1 | |
| (8) | Antioxidant | 0–2 | |
| (9) | Dye | 0–0.1 | |
| (10) | Sequestering agent | 0–0.1 | |

In the above formulation, the pour point depressants or viscosity modifiers include glycols having 2 to 12 carbon atoms such as ethylene glycol, diethylene glycol, triethylene glycol, propylene glycol, tripropylene glycol and mixtures thereof. The oiliness improvers include aliphtic or aromatic carboxylic acids, preferably having at least 6 carbon atoms such as caprilic acid, oleic acid, dimer acids, benzoic acid, dimethyl benzoic acid, and alkali metal or organic amine salts thereof such as of morpholine. Rust inhibitors include monoethanolamine, diethanolamine, triethanolamine, ethylenediamine, diethylenetriamine, cyclohexylamine, morpholine, 1,4-bis(2-aminoethyl)piperidine, 2-hepadecyl-1-(2-hydroxyethyl)imidazoline, derivatives thereof (alkylene oxide addition products), alkali metal salts of carboxylic acids (The carboxylic acids are the same as those for the oiliness improvers mentioned above.) and cyclohexylamine nitrite. In some cases, amine or alkali metal salts of the carboxylic acids (the amines and carboxylic acids are the same as those mentioned for the rust inhibitor and oiliness improvers, respectively) may serve both as the rust inhibitor and the oiliness improver. pH conditioners include the organic amines as mentioned for the rust inhibitors, and alkali metal hydroxides. In some cases, oiliness improvers or rust inhibitors may also be used as the pH conditioner. Foam inhibitors include silicones of the emulsion type. Antioxidants include benzotriazole, mercaptobenzoimidazole and mercaptobenzotriazole. The dyes include basic dyes and acid dyes. The sequestering agents include aminocarboxylic acids (and derivatives thereof, especially metal salts thereof) such as ethylenediaminetetraacetic acid, diethylenetriaminepentaacetic acid, sodium or copper salts thereof, and oxycarboxylic acids (and derivatives thereof, especially metal salts thereof) such as tartaric acid and sodium gluconate. There may also be used mixtures of these compounds.

The water solble polymer of this invention may be also used as a component of a hydraulic fluid of an emusion type.

The fluids of this invention containing the water soluble polymer have improved shear stability and good lubricating and wear preventing qualities. Furthermore, the fluids of this invention possess the various characteristics which are required in a water glycol hydraulic fluid such as fire-resistance, water-solubility, favorable viscosity parameters and low foaming properties. Moreover, the fluids of this invention have such good stability that they do not become turbid even after long operation in hydraulic devices.

The water-glycol hydraulic fluids of this invention are also useful for transmission of energy in hydraulic devices such as hot rolling equipment, various furnaces in iron works, presses such as die casting equipment, conveyors, cranes and forklift trucks.

Having generally described this invention, a further understanding can be obtained by reference to certain specific examples which are provided herein for purposes of illustration only and are not intended to be limiting unless otherwise specified.

Polymers used in Examples are as follows:
(1) Polymer A: Polyoxyalkylene ether of sorbitol (average molecular weight: about 25,000, hydroxyl number: 13.5), prepared by adding a mixture of ethylene oxide (EO) and propylene oxide (PO) (EO:PO=80:20 by weight)
(2) Polymer B: Polyoxyalkylene ether sorbitol (average molecular weight: about 31,000, hydroxyl number: 10.9), prepared by adding a mixture of EO and PO (EO:PO=80:20 by weight).
(3) Polymer C: Polyoxyalkylene ether of sucrose (average molecular weight: about 37,000, hydroxyl number: 12.1), prepared by adding a mixture of EO and PO (EO:PO=80:20 by weight).
(4) Polymer D: Polyoxyalkylene ether of dipentaerythritol (average molecular weight: about 26,000, hydroxyl number: 13.0), prepared by adding a mixture of EO and PO (EO:PO=80:20 by weight).
(5) Polymer E (Conventional polymer): Polyalkylene glycol (average molecular weight: about 15,000), prepared by adding a mixture of EO and PO (EO:PO=75:25 by weight) to ethylene glycol.
(6) Polymer F (Conventional polymer): Polyoxyalkylene derivative of glycerin (average molecular weight: about 23,000), obtained by adding a mixture of EO and PO (EO:PO=65:35 by weight).
(7) Polymer G (Conventional component): Polyoxyalkylene derivative of polyamide (average molecular weight: about 85,000), prepared by adding mixture of EO and PO (EO:PO=80:20 by weight) to a condensation product of 2 mole of dimer acid (acid number; 190) and 3 moles of pentaethylenehexamine.
(8) Polymer H (Conventional polymer): Polyoxyalkylene derivative of ethylenediamine (average molecular weight: about 27,000), prepared by adding PO (20% by weight) and then EO (80% by weight) alternately.

EXAMPLE 1. (TEST OF LUBRICITY TO METAL)

Test of the lubricity to metal was conducted with each of the polymers (polymers A–D) of this invention in comparison with the conventional polymers (polymers E–H). Lubricity to metal (coefficient of friction, $\mu$) was measured by the shell 4-ball E.P. (Extreme Pressure) Lubricant Tester, using an aqueous solution of the test polymer in a concentration of 5 wt. % under the conditions of 600 rpm (revolution speed) and 40, 60, 80 and 100 kg load.

The results are given in Table 1. They show that the polymers of this invention (polymers A–D) are superior to the conventional polymers (polymers E–H) in lubricity to metal.

TABLE 1

| Load (Kg) | Coefficient of Friction | | | | | | | |
|---|---|---|---|---|---|---|---|---|
| | Polymer A | Polymer B | Polymer C | Polymer D | Polymer E (conventional) | Polymer F (conventional) | Polymer G (conventional) | Polymer H (conventional) |
| 40 | 0.383 | 0.404 | 0.386 | 0.383 | 0.464 | 0.464 | 0.382 | 0.464 |
| 60 | 0.359 | 0.373 | 0.359 | 0.343 | 0.375 | 0.382 | 0.318 | 0.383 |
| 80 | 0.321 | 0.336 | 0.326 | 0.336 | 0.358 | 0.355 | 0.310 | 0.347 |
| 100 | 0.298 | 0.302 | 0.305 | 0.302 | 0.345 | 0.345 | 0.300 | 0.336 |

EXAMPLE 2. (FORMULATIONS OF WATER-GLYCOL HYDRAULIC FLUIDS)

According to the formulations shown in Table 2, water-glycol hydraulic fluids (Fluids A–D) of this invention were prepared using polymers A–D. For comparison, conventional water-glycol hydraulic fluids (Fluids E–H) were also prepared using polymers E–H.

TABLE 2

| Fluids Components | Fluid A | Fluid B | Fluid C | Fluid D (conventional) | Fluid E (conventional) | Fluid F (conventional) | Fluid G (conventional) | Fluid H (conventional) |
|---|---|---|---|---|---|---|---|---|
| Water | 400* | 420 | 430 | 400 | 420 | 420 | 430 | 420 |
| Polymer A | 180 | | | | | | | |
| Polymer B | | 160 | | | | | | |

TABLE 2-continued

| Fluids Components | Fluid A | Fluid B | Fluid C | Fluid D (conventional) | Fluid E (conventional) | Fluid F (conventional) | Fluid G (conventional) | Fluid H (conventional) |
|---|---|---|---|---|---|---|---|---|
| Polymer C | | | 150 | | | | | |
| Polymer D | | | | 180 | | | | |
| Polymer E (conventional) | | | | | 160 | | | |
| Polymer F (conventional) | | | | | | 160 | | |
| Polymer G (conventional) | | | | | | | 150 | |
| Polymer H (conventional) | | | | | | | | 160 |
| Diethylene glycol | 400 | 400 | 400 | 400 | 400 | 400 | 400 | 400 |
| Morpholine salt of caprilic acid | 25 | 25 | 25 | 25 | 25 | 25 | 25 | 25 |
| Foam inhibitor** | 1 | 1 | 1 | 1 | 1 | 1 | 1 | 1 |
| Antioxidant*** | 2 | 2 | 2 | 2 | 2 | 2 | 2 | 2 |
| Sequestering agent**** | 0.3 | 0.3 | 0.3 | 0.3 | 0.3 | 0.3 | 0.3 | 0.3 |
| Total | 1008.3 | 1008.3 | 1008.3 | 1008.3 | 1008.3 | 1008.3 | 1008.3 | 1008.3 |

*parts by weight,
**silicon emulsion,
***benzotriazol,
****diethylenetriamine pentaacetic acid pentasodium salt.

EXAMPLE 3. (PUMP TESTS OF THE WATER-GLYCOL FLUIDS)

Pump tests of the hydraulic fluids of Example 2 were carried out by the method of ASTM D 2882-70T. Operational conditions were as follows:

| (a) | Hydraulic pump | Vickers V-104-E vane pump |
|---|---|---|
| (b) | Fluid quantity | 40 liters |
| (c) | Relief valve pressure | 70 Kg/cm$^2$ |
| (d) | Pump shaft speed | 1,200 rpm |
| (e) | Fluid temperature at pump inlet | 50° C. |

The results are given in Table 3, which show that the hydraulic fluids of this invention (Fluids A–D) are superior to the conventional hydraulic fluids (Fluids E,F,H) in anti-wear qualities (cam ring and vanes), sludge preventing qualities and stability of the fluids (appearance of the fluid) after pump test and also superior to the conventional hydraulic fluid (Fluid G and H) in shear stability (viscosity stability).

EXAMPLE 4. (PUMP TESTS OF THE WATER-GLYCOL HYDRAULIC FLUIDS)

Pump tests were repeated in the same manner as in Example 3 except that the test periods were 100, 250 and 500 hrs.

The results are given in Table 4.

| Test time (hrs.) | | Fluid A | Fluid E (conventional) |
|---|---|---|---|
| 100 | Cam ring wear (mg) | 311.2 | 871.1 |
| | Vanes wear (mg) | 10.7 | 0.6 |
| | Sludge preventing quality* | Good | Fair |
| | Appearance of the fluid** (after pump test) | Good | Good |
| 250 | Cam ring wear (mg) | — | 2385.7 |
| | Vanes wear (mg) | — | 2.5 |
| | Sludge preventing quality* | — | Fair |
| | Appearance of the fluid** (after pump test) | — | Good |
| 500 | Cam ring wear (mg) | 312.0 | — |
| | Vanes wear (mg) | 17.2 | — |
| | Sludge preventing quality* | Good | — |

TABLE 3

| Test time (hrs) | | Fluid A | Fluid B | Fluid C | Fluid D | Fluid E (conventional) | Fluid F (conventional) | Fluid G (conventional) | Fluid H (conventional) |
|---|---|---|---|---|---|---|---|---|---|
| 50 | Cam ring wear (mg) | 307.8 | 299.2 | 281.0 | 305.8 | 286.7 | 350.2 | 310.1 | 305.9 |
| | Vanes wear (mg) | 3.1 | 4.5 | 3.5 | 4.2 | 0.5 | 0.4 | 2.6 | 0.6 |
| | Sludge preventing quality* | Good | Good | Good | Good | Fair | Poor | Good | Fair |
| | Appearance of the fluid** (after pump test) | Good | Food | Good | Good | Good | Good | Good | Good |
| 100 | Cam ring wear (mg) | 311.4 | 309.2 | 300.6 | 310.9 | 871.1 | 1539.6 | 311.5 | 936.7 |
| | Vanes wear (mg) | 10.1 | 9.7 | 8.2 | 9,3 | 0,6 | 0.7 | 6.7 | 1.1 |
| | Sludge preventing quality* | Good | Good | Good | Good | Fair | Fair | Good | Fair |
| | Appearance of the fluid** (after pump test) | Good | Good | Good | Good | Good | Fair | Good | Good |
| | Reduction of viscosity(%)*** | 0.10 | 0.15 | 0.19 | 0.11 | 0.15 | 0.19 | 0.81 | 0.75 |

*Sludge preventing quality
Good: No sludge
Fair: A little sludge
Poor: Much sludge
**Appearance of the fluid
Good: No change and no turbidity
Fair: A little turbidity
Poor: Much change and much turbidity
***$(1 - \frac{\text{Viscosity (Cst. at 40° C.) after test}}{\text{Viscosity (Cst. at 40° C.) before test}}) \times 100\%$

| Test time (hrs.) | Fluid A | Fluid E (conventional) |
|---|---|---|
| Appearance of the fluid** (after pump test) | Good to Fair | — |

* and ** are the same as in TABLE 3.

Table 4 shows that the hydraulic fluid of this invention (Fluid A) is superior to the conventional hydraulic fluid (Fluid E) in anti-wear qualities (cam ring and vanes), sludge preventing qualities and stability of the fluid (appearance of the fluid after the pump test).

EXAMPLE 5 (PUMP TESTS OF THE WATER-GLYCOL HYDRAULIC FLUIDS)

Pump tests were repeated with Fluid A in the same manner as in Example 3 except that the Relief valve pressure is 105 Kg/cm².

TABLE 5

| Test time (hrs.) | | Fluid A |
|---|---|---|
| 20 | Cam ring wear (mg) | 507.8 |
| | Vanes wear (mg) | 4.5 |
| | Sludge preventing quality* | Good |
| | Appearance of the fluid** (after pump test) | Good |
| 100 | Cam ring wear (mg) | 554.0 |
| | Vanes wear (mg) | 10.9 |
| | Sludge preventing quality* | Good |
| | Appearance of the fluid** | Good |

* and ** are the same as in TABLE 3.

Table 5 shows that the hydraulic fluid of this invention (Fluid A) has good anti-wear qualities (low cam ring and vanes wear), sludge preventing qualities and stability of the fluid (appearance of the fluid after pump test), even under higher Relief value pressure of 105 Kg/cm².

EXAMPLE 6 (SHEAR STABILITY TESTS)

Shear stability test of 10% (by weight) solution of each of the polymers (Polymers A–H) in propylene glycol was carried out by Diesel injection method. Operating conditions and procedure are as follows:
Nozzle pressure: 175 Kg/cm²
Flow rate: 170±5 ml/min.
Number of pass times: 250 pass
Procedure:
EURONORM (5th), JIS K 2232 or IP 133
EURONORM (5th) means FIFTH REPORT on specification and testing conditions relating to fire-resistant fluids used for power transmission (COMMISSION OF THE EUROPEAN COMMUNITIES).
JIS means Japanese Industrial Standard.
IP means the Institute of Petroleum.
The results are given in Table 6.

TABLE 6

| Polymer | Viscosity (Cst. at 40° C.) | | Reduction of Viscosity (%) |
|---|---|---|---|
| | before test | after test | |
| Polymer A | 61.0 | 60.7 | 0.49 |
| Polymer B | 71.6 | 71.1 | 0.70 |
| Polymer C | 80.2 | 79.6 | 0.75 |
| Polymer D | 62.0 | 61.6 | 0.65 |
| Polymer E | 65.2 | 64.3 | 0.77 |
| Polymer F | 67.3 | 66.8 | 0.74 |
| Polymer G | 77.4 | 76.0 | 1.81 |
| Polymer H | 62.8 | 61.7 | 1.75 |

Having now fully described the invention, it will be apparent to one of ordinary skill in the art that many changes and modifications can be made thereto without departing from the spirit or scope of the invention as set forth herein.

What is claimed as new and desired to be secured by Letters Patent is:

1. A non-flammable hydraulic fluid, which comprises: 5–30% of a water soluble polymer comprising a polyoxyalkylene ether of a polyhydric alcohol having at least five hydroxyl groups and having no nitrogen atom, 30–60% of water and 15–60% of a glycol; wherein said polyoxyalkylene ether has oxalkylene groups comprising both oxyethylene groups and other oxyalkylene groups in random form.

2. The hydraulic fluid of claim 1, wherein said polyoxyalkylene ether has an average molecular weight of 5,000 to 200,000.

3. The hydraulic fluid of claim 1, wherein said other oxyalkylene groups are selected from the group consisting of oxypropylene, oxybutylene, oxytetramethylene and oxystrene.

4. The hydraulic fluid of claim 3 wherein said other oxyalkylene group is oxypropylene.

5. The hydraulic fluid of claim 1, wherein the weight ratio of oxyethylene groups (A) to the other oxyalkylene groups (B) is 50(A):50(B)–90:10.

6. The hydraulic fluid of claim 1, wherein said polyhydric alcohol have the formula:

$$R(OH)_n$$

wherein n is an integer of at least 5 and R is a polyvalent hydrocarbon radical which may contain at least one etherally combined oxygen atom.

7. The hydraulic fluid of claim 1, wherein said polyhydric alcohol is selected from the group consisting of a saccharide, a derivative of a saccharide and a polyalkanepolyol.

8. The hydraulic fluid of claim 7, wherein the saccharide is a polysaccharide.

9. The hydraulic fluid of claim 8, wherein the polysaccharide is an oligosaccharide.

10. The hydraulic fluid of claim 9, wherein the oligosaccharide is sucrose.

11. The hydraulic fluid of claim 7, wherein said derivative is a sugaralcohol or a glycoside.

12. The hydraulic fluid of claim 7, wherein said derivative is a sugaralcohol.

13. The hydraulic fluid of claim 12, wherein the sugaralcohol is sorbitol.

14. The hydraulic fluid of claim 7, wherein the glycoside is a glucoside of an alkanepolyol.

15. The hydraulic fluid of claim 7, wherein the polyalkanepolyol is a polyglycerin or a polypentaerythritol.

16. The hydraulic fluid of claim 7 wherein said polyhydric alcohol is selected from the group consisting of a saccharide and a derivative thereof.

17. The flammable hydraulic fluid of claim 1, wherein the glycol has 2 to 12 carbon atoms.

18. The flammable hydraulic fluid of claim 1, wherein at least one conventional additive selected from the group consisting of viscosity modifiers, oiliness improvers, rust inhibitors, pH conditioners, foam inhibitors, antioxidants, dyes and sequestering agents is incorporated into the fluid.

19. The flammable hydraulic fluid of claim 18, wherein the conventional additive is an oil improver, a rust inhibitor, an antioxidant, a dye, a sequestering agent or a mixture thereof.

20. A method of lubricating and preventing wear in a hydraulic device, which comprises: providing said device with the fluid of claim 1.